(12) United States Patent
del Mundo et al.

(10) Patent No.: US 11,669,585 B2
(45) Date of Patent: Jun. 6, 2023

(54) OPTIMIZING BINARY CONVOLUTIONAL NEURAL NETWORKS

(71) Applicant: XNOR.ai, Inc., Seattle, WA (US)

(72) Inventors: Carlo Eduardo Cabanero del Mundo, Seattle, WA (US); Ali Farhadi, Seattle, WA (US)

(73) Assignee: Apple Inc., Cupertino, CA (US)

( * ) Notice: Subject to any disclaimer, the term of this patent is extended or adjusted under 35 U.S.C. 154(b) by 929 days.

(21) Appl. No.: 16/452,441

(22) Filed: Jun. 25, 2019

(65) Prior Publication Data

US 2020/0410318 A1    Dec. 31, 2020

(51) Int. Cl.
  *G06F 17/15* (2006.01)
  *G06N 3/04* (2023.01)
  *G06F 7/544* (2006.01)

(52) U.S. Cl.
  CPC ............ *G06F 17/15* (2013.01); *G06F 7/5443* (2013.01); *G06N 3/04* (2013.01)

(58) Field of Classification Search
  CPC .............................. G06F 17/15; G06F 7/5443
  See application file for complete search history.

(56) References Cited

U.S. PATENT DOCUMENTS

| | | | |
|---|---|---|---|
| 2018/0300600 A1* | 10/2018 | Ma | G06N 3/04 |
| 2018/0307950 A1* | 10/2018 | Nealis | G06F 9/3001 |
| 2018/0308206 A1* | 10/2018 | Surti | G06N 3/084 |

* cited by examiner

*Primary Examiner* — Michael D. Yaary
(74) *Attorney, Agent, or Firm* — BakerHostetler

(57) ABSTRACT

In one embodiment, a method includes receiving an input tensor corresponding to a media object at a binary convolutional neural network, wherein the binary convolutional neural network comprises at least one binary convolution layer comprising one or more weights, and wherein the media object is associated with a particular task, binarizing the input tensor by the at least one binary convolution layer, binarizing the one or more weights by the at least one binary convolution layer, and generating an output corresponding to the particular task by the binary convolutional neural network based on the binarized input tensor and the binarized one or more weights.

21 Claims, 11 Drawing Sheets

Winograd Convolutions

Binary Convolutions

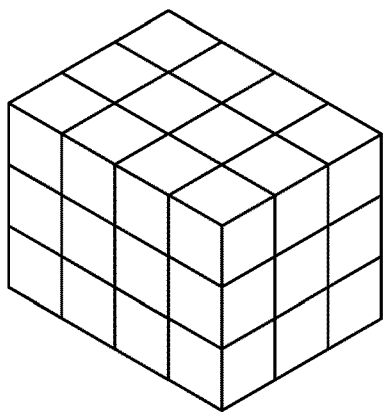
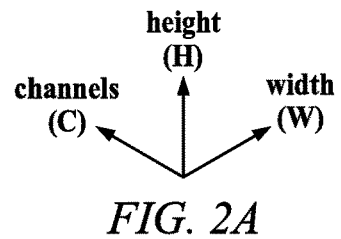
*FIG. 2A*
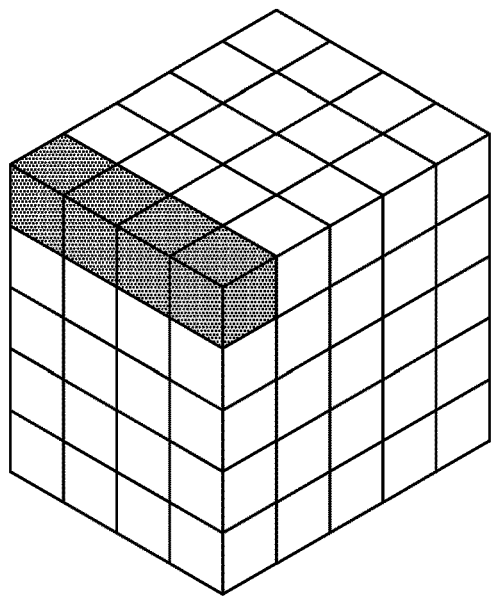
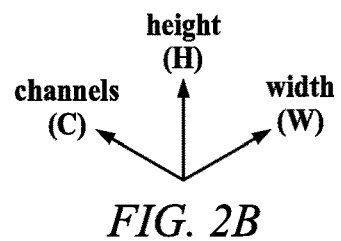
*FIG. 2B*
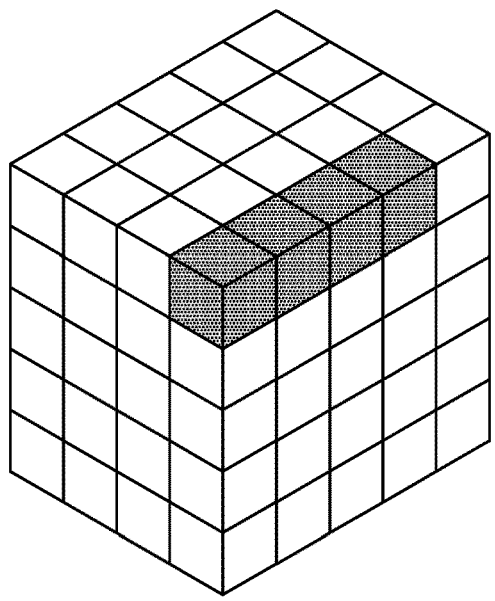
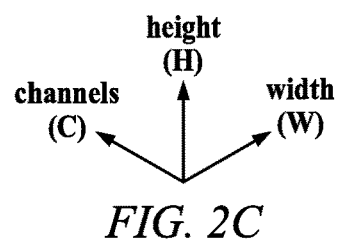
*FIG. 2C*

```
float accumulator = 0. f ;
for (int32_t i = 0 ; i < N; ++i) {
    float input, filter = [ . . . ] ;
    accumulator += input * filter ;
}
```
                                            (a) dot product

```
int32_t accumulator = 0 ;
for (int32_t i = 0; i < N/32: ++1) {
    int32_t input, filter, mask = [. . .] ;
    int32_t xnor_ product = ~ (input ^ filter) & mask;
    int32_t num_positive_ones = popc (xnor_product);
    int32_t num_negative_ones = popc (~xnor_product);
    int32_t mask_adjustment = popc (~mask);
    accumulator += num_positive_ones -
        num_negatives - mask_adjustment ;
}
```
                                            (b) xnor product (naive)

```
int32_t accumulator = 0 ;
for (int32_t i = 0; i , N/32; ++i) {
    int32_t input, mask = [. . .] ;
    int32_t xor_product = (input ^ filter) & mask ;
    accumulator = popc(xor_product) ;
}
```
                                            (c) xor product (optimized)

FIG. 4

OPTIMIZING BINARY CONVOLUTIONAL NEURAL NETWORKS

TECHNICAL FIELD

This disclosure generally relates to data analysis, and in particular relates to multimedia data analysis using machine-learning algorithms.

BACKGROUND

Machine learning (ML) is the study of algorithms and mathematical models that computer systems use to progressively improve their performance on a specific task. Machine learning algorithms build a mathematical model of sample data, known as "training data", in order to make predictions or decisions without being explicitly programmed to perform the task. Machine learning algorithms may be used in applications such as email filtering, detection of network intruders, and computer vision, where it is difficult to develop an algorithm of specific instructions for performing the task. Machine learning is closely related to computational statistics, which focuses on making predictions using computers. The study of mathematical optimization delivers methods, theory, and application domains to the field of machine learning. Data mining is a field of study within machine learning and focuses on exploratory data analysis through unsupervised learning. In its application across business problems, machine learning is also referred to as predictive analytics.

Computing resources are, by their very nature, finite. Administrators around the world bemoan the fact that their infrastructures lack network bandwidth, CPU cycles, RAM, and secondary storage. Invariably, the lack of these resources leads to some form of degradation of the services the computing infrastructure delivers to clients. Computing resources are limited and, given the complexity of geophysical fluid dynamics, the algorithms should be computationally efficient in order to allow for high-resolution runs and/or a large number of prognostic variables. Efficiency is, however, hard to measure objectively. One measure for the efficiency of an algorithm is the number of elementary mathematical operations or the total number of floating-point operations per second (FLOPS) used by the algorithm. The actual program execution involves subscripting, memory traffic and countless other overheads. In addition, different computer architectures favor different kinds of algorithms and compilers optimize code differently.

SUMMARY OF PARTICULAR EMBODIMENTS

Binary convolution is a convolution primitive used in concert with binary convolutional neural networks (bCNNs) which aggressively quantize the weight and input activation space into binary +1/−1. By binarizing both activations and weights in almost all convolution layers, convolutions may be cheaper for computing transforming floating point operations into integer XOR, POPCOUNT, and IADD operations.

Particular embodiments disclosed herein implement binary convolution in the context of a production level ResNet-50 bCNN model achieving a geometric speedup of 9× comparing binary GEMM (bGEMM) and real GEMM in isolation. Not all layers inside bCNNs are binary-valued, which gives rise to a binary tax, the cost incurred when operations spill to real valued data. To address the cost of binary/real layer transitions, particular embodiments propose the single shot layer wise fusion for binary basic blocks. This optimization co-designs real-valued layers in concert with bGEMM to significantly reduce DRAM bus contention by a factor of 32 improving performance by 66%. Although this disclosure describes implementing particular convolutions in particular manners, this disclosure contemplates implementing any suitable convolution in any suitable manner.

Particular embodiments disclosed herein may produce a bCNN workload on ResNet-50 comparable in classification accuracy to its state-of-the-art float32 counterpart, while improving convolutional layer performance and network memory consumption by a factor of 4.9× and 4.6×, respectively, over the optimized cuDNN 7 library during inference on a GTX 1080 GPU.

In particular embodiments, a computing system may receive, at a binary convolutional neural network, an input tensor corresponding to a media object. The binary convolutional neural network may comprise at least one binary convolution layer comprising one or more weights. The media object may be associated with a particular task. In particular embodiments, the computing system may binarize, by the at least one binary convolution layer, the input tensor. The computing system may also binarize, by the at least one binary convolution layer, the one or more weights. In particular embodiments, the computing system may further generate, by the binary convolutional neural network, an output corresponding to the particular task based on the binarized input tensor and the binarized one or more weights.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

BRIEF DESCRIPTION OF THE DRAWINGS

FIG. 2A illustrates an example goal of extracting may input patches of size 3×3×4.

FIG. 2B illustrates an example input tensor laid out in channel first order (HWC).

FIG. 2C illustrates an example input tensor laid out in row first order (CHW).

FIG. 4 illustrates example microkernels representing the essence of real and binary matrix multiply.

DESCRIPTION OF EXAMPLE EMBODIMENTS

Convolutional neural networks (CNNs) are the de facto tool for deep learning enabling state of the art results in many learning tasks. Most of the execution time in CNNs is dominated by convolution. Conventional embodiments have focused on fast convolution algorithms as well as methods during training to expose favorable hardware/software implementations.

Particular embodiments disclosed herein present a technique for computing convolutions by using binary convolutions in concert with binary convolutional neural networks (bCNNs). bCNNs like XNORNet train the network such that when weights and activations in convolutional layers are quantized to +1/−1, the convolution becomes binary-valued replacing FMAD into integer XNOR, POPCOUNT, and IADD operations.

Figure 1A:
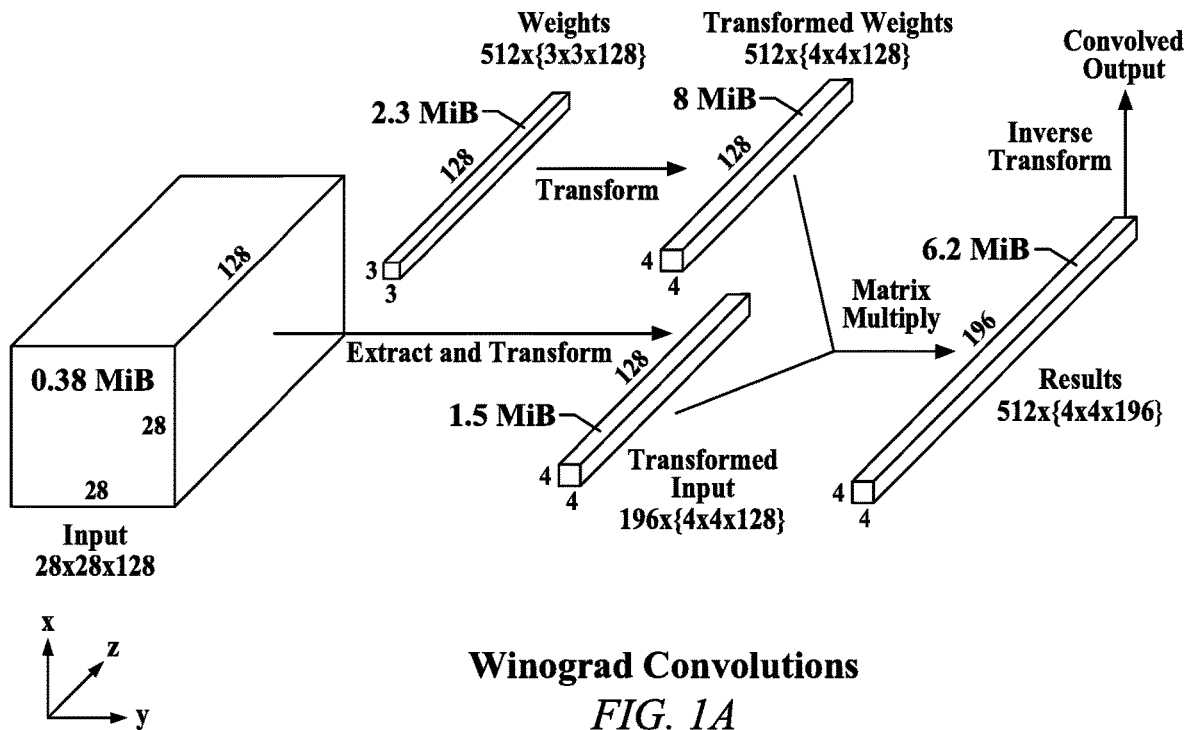
FIG. 1A illustrates an example representation of the sizes of intermediate tensors generated by state-of-the art Winograd convolutions.
Figure 1B:
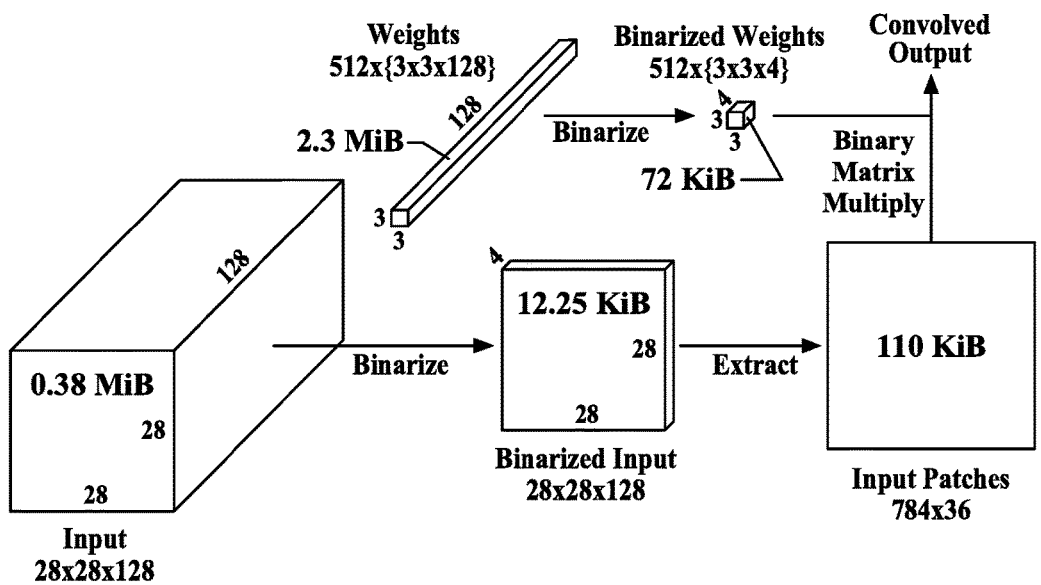
FIG. 1B illustrates an example representation of the sizes of intermediate tensors generated by binary convolutions.

In addition to potential performance gains, binarized convolutional layers are compact. FIGS. 1A-1B illustrate example representations of the sizes of intermediate tensors generated by state-of-the-art Winograd convolutions and binary convolutions. FIG. 1A illustrates an example representation of the sizes of intermediate tensors generated by state-of-the art Winograd convolutions. FIG. 1B illustrates an example representation of the sizes of intermediate tensors generated by binary convolutions. Particular embodiments disclosed herein may use a convolution layer found in ResNet-50 of size 28×28×128, filter size of 3×3 with 512 output filters, and the F(2×2,3×3) Winograd derivation which is a memory efficient Winograd algorithm. The memory consumption gap in this layer is 81× in favor of binary convolution with intermediate scratchpad storage reaching 15.7 MiB in Winograd. Most of the memory savings may occur at the binarization step where the channel dimension in both input and weights are shrunk by a factor of 32. Binary convolution may use significantly less memory while improving performance. FIGS. 1A-1B visualize one convolution layer in ResNet-50 of size 28×28×128 with 512 output filters and a filter size of 3. Intermediate buffers consume 15.7 MiB and 0.19 MiB for Winograd and binary convolution, respectively. The data type size is 32 bits in both cases and all rectangular parallelepipeds are drawn in proportion to each other with an x:y:z ratio of 2:2:1.

Contrary to popular belief, bCNNs may achieve similar accuracy as their real-valued counterparts. For instance, the XNORNet workload characterized in embodiments disclosed herein achieves classification accuracy comparable of its state-of-the-art real-valued ResNet-50 counterpart. These results are promising, suggesting that bCNNs may further accelerate a wide variety of DNN architectures during inference with less memory.

Not all computation is binarized in bCNNs. While inputs and weights are binary-valued for binary convolution, the outputs are real-valued. Furthermore, intermediate layers such as batch normalization and maxpool may be difficult to binarize without degrading accuracy, still perform real-valued operations. This gives rise to a phenomenon coined as the binary tax, the penalty when performing feedforward inference for layers that alternate between real and binary values.

To the best of our knowledge, this is the first work that analyzes the performance characteristics of binary convolutions in concert with a real production level bCNN based on ResNet-50. The GPU design in the embodiments disclosed herein is latency optimized compared to other works which focus on batched execution to maximize performance. The contributions are as follows.

1. bGEMM. Particular embodiments designed and implemented a variant of bGEMM (or binary Generalized Matrix Multiplication) compatible with XNORNet networks and analyze its performance characteristics on an NVIDIA GPU.

2. Single shot, layer wise fusion. To address the cost of binary/real layer transitions, particular embodiments disclose the single shot layer wise fusion for binary basic blocks. This optimization co-designs real-valued layers in concert with bGEMM to significantly reduce DRAM bus contention by a factor of 32 improving binary basic block performance by 66%.

3. Evaluation and analysis on ResNet-50. Particular embodiments evaluate bGEMM vs. GEMM performance in isolation and in concert with layers like bias addition, batch normalization and activation using convolutional layers found in ResNet-50. Finally, particular embodiments evaluate the optimized convolution implementations against the fastest available in cuDNN 7.

The results suggest that to effectively optimize bCNNs, the favorable data layout is NHWC where values are contiguous in the channel dimension. This data layout is particularly favorable in ResNet since 1×1 convolutions do not require an intermediate lowering step. To address performance penalties across real and binary layers, particular embodiments fuse operations in a novel way. The GPU reads tensor data as binary, a fused binary/real-valued kernel process the data, and before writing back to DRAM, the tensor data is binarized in preparation for the next layer. bGEMM may be sensitive to the matrix dimensions; a small 8×8 threadblock size is recommended to cover the input sizes in ResNet-50 convolutions. Unintuitively, the op:byte analysis in the embodiments disclosed herein show that binary convolutions are more compute-bound than their float32 counterparts.

CNN Layers Input Preprocessing. In particular embodiments, the computing system may generate the input tensor based on the media object. As an example and not by way of limitation, the media object may be an image, a video, a text, an audio clip, or any combination thereof. The generation may comprise decoding the media object into an interleaved tensor comprising one or more values and normalizing the one or more values to one or more floating-point values. To be more specific, the input layer transforms images into a friendly format for CNNs. An image is read from a file (such as JPEG) and decoded as an interleaved tensor of RGB values. Each value is an 8-bit type in [0..255]. Then, images are normalized to floating point in the range [0.0..1.0] followed by standardization to zero mean and unit variance. In particular embodiments, the input tensor may be associated with a particular data layout. The particular data layout may correspond to one or more dimensionalities of the input tensor. Each of the one or more dimensionalities may comprise one of height, width, or channel. The native data layout is in HWC order and a batch of these images create a 4D tensor in NHWC order. The data layout order in the 4D tensor may be transposed to a different order depending on the backend implementation of the framework. Caffe and PyTorch, for instance, favor CHW layouts in their implementations, while the default for convolutions in TensorFlow is HWC. The input layer is processed offline away from the critical path of execution.

Convolution. The primary study in the embodiments disclosed herein is convolution and its binary variants. A convolution layer consists of an input and a filter tensor. Similar to convolution in signal processing, the filter matrix is swept across the input tensor to generate an output. There are at least two popular methods to compute the convolution efficiently: (1) lowered convolutions, and (2) FFT-based convolutions. Either method may be implemented using (half) floating point and fixed-point arithmetic. Inputs and outputs are real-valued.

In lowered convolutions, an input tensor (e.g., an image) is c-dimensional; it contains width (w), height (h), and channel (c or depth). As an example and not by way of limitation, the input tensor may be three-dimensional. This input 3D tensor is reordered by copying smaller regions of the input of the same size as a filter tensor and copied directly into an intermediate output buffer. This new representation unrolls the 3D input windows to a 2D matrix. Each entry of the matrix is of length equal to the size of a 3D filter tensor but flattened. Contemporary networks use a filter size of 3*3*c. Therefore, a tensor of size w*h*c generates an intermediate output buffer size of w*h*(3*3*c)—a 9-fold increase from the original buffer size. This lowered input buffer scales linearly with the number of filters. While memory usage grows with lowered convolutions, the problem of computing the convolution is now recast as a matrix-matrix operation, an operation studied and optimized extensively for many decades in the HPC community. The embodiments disclosed herein refer to lowering as patch extraction. decoding the result using the inverse transform. The output is equivalent to time domain convolutions.

The embodiments disclosed herein study a less popular convolution implementation: binary convolution. The computing system may perform one or more binary convolutions between the binarized input tensor and the binarized one or more weights to generate the output corresponding to the particular task. In binary convolution, both filter and input activation space into binary (+1 or −1). The computation is similar to a regular convolution with the exception that dot products are performed using XNOR and POPCOUNT operations instead of multiplication and addition. In other words, each of the one or more binary convolutions may be based on one or more of an XNOR operation or a POPCOUNT operation. Data layout order plays a major role in the performance of this primitive as tensor values span across int words especially in the context of GPUs where the native word size is 32-bit. Particular embodiments disclosed herein design a scheme for enabling contiguous access to binary words compatible with contemporary neural network architecture designs. Binary convolution ingests a binary-valued input to produce a real-valued output.

Batch Normalization. To accelerate training time and to improve training accuracy, batch normalization normalizes input batches to have zero mean and unit variance. During training time, several constants for multiplication and biases are learned. Then, at inference time, these constants may be folded into a simpler algebraic expression resulting in a fused-multiply-and-add per input value. Batch normalization ingests a real-valued input to produce a real-valued output.

Pooling. Pooling reduces the input tensor into a smaller representation determined by the pool window size. Common variants are 2×2 maxpooling where tensors are reduced by only choosing the max value within a 2×2 window, and average pooling, where elements in a feature map is reduced to a singular value by mean averaging. The pooling primitive may be implemented using simple max operations. Pooling ingests a real-valued input to produce a real-valued output.

Activation. A nonlinear activation function is applied to the output usually in the form of a rectified linear unit (ReLU) and other variants. The computation for ReLU is a pointwise max operation such as v=max(v, 0.0). It is embarrassingly parallel and may be made branchless. Activation ingests a real-valued input to produce a real-valued output.

Binarization. Binarization extracts the sign of a real-valued tensor and packs it into a bitarray. Values greater than 0 are represented as "0b1", else it is "0b0". As an example and not by way of limitation, the input tensor may comprise a plurality of values. Accordingly, binarizing the input tensor may comprise extracting, for each of the plurality of values, a sign associated with the value, and packing, for each of the plurality of values, the extracted sign into a bitarray. In HWC order, the input tensor is treated as a 1D array. Other data layouts require additional orchestration to store bits within and across binary words. In particular embodiments, binarizing the input tensor may comprise reading, by one or more warps, the one or more floating-point values, and performing, by the one or more warps, sign comparison and shift extraction on the one or more floating-point values. In the GPU implementation of the embodiments disclosed herein, each warp reads 32-float elements and performs sign comparison and shift extraction in parallel. The warp collaboratively reduces the sign values using the intra-warp shuffle instruction requiring no shared memory. When the value is reduced, a single thread in the warp writes the uint32_t result back to global memory. Binarization ingests a real-valued input to produce a binary-valued output.

Output Postprocessing. The final layer decodes the network output and is determined by the task. For image classification, a set of probabilities is output using a classifier where the argmax is the most likely label for the input image. In object detection such as YOLO (i.e., a conventional work), class probabilities, bounding box coordinates, and their size are output. The final layer is typically real-valued, but since it is very small relative to the rest of the network, it consumes very little of execution time.

The order in which contiguous data elements is defined in a tensor is known as the tensor data layout. The order is designated as a set of letters (e.g., CHW, NHWC) and the number of letters determine the dimensionality of the tensor. The order is read from right-to-left with the rightmost letter signifying stride-1 contiguity. A tensor encoded in CHW format encodes data that is stride-1 in the width dimension, followed by stride-W in the height dimension, and finally stride-H*W in the channel dimension. The selection of the data layout order has a major influence on the resulting performance of convolutional layers. The optimal data layout for binary convolution may be NHWC which elides the need to perform intra- and inter-bit shuffling when performing patch extraction. This goes counter to data layout formats on GPU convolution literature which proposes CHWN and NCHW, the former of which is sensitive to the batch parameter, N, which is incompatible to the latency-sensitive design in this work.

An operation that precedes convolution is the patch extraction transformation where the input is read in filter-sized windows and re-represented as a 2D matrix. In particular embodiments, the computing system may perform a patch extraction transformation on the input tensor. The patch extraction transformation may comprise reading the input tensor in one or more particular windows and representing the input tensor as a two-dimensional matrix. Data layouts play a critical role in the performance of patch extraction especially for binary convolution. FIGS. 2A-2C illustrate example effect of data layout on the number of contiguous memory transactions for extracting patches. FIG. 2A illustrates an example goal of extracting may input patches of size 3×3×4. FIG. 2B illustrates an example input tensor laid out in channel first order (HWC). FIG. 2C illustrates an example input tensor laid out in row first order (CHW). The goal shown in FIG. 2A is to extract multiple 3×3×4 window patches from an input tensor of size 5×5×4 into a 2D matrix representing an intermediate output to be used for matrix-matrix multiplication.

In the channel-major (HWC) layout shown in FIG. 2B, a 4 element read that spans channels in fully utilizes the transaction to populate the output with no wasted elements. Writes to the intermediate output is also contiguous. In the row-major (CHW) method shown in FIG. 2C, a read spans 4 elements in the width direction resulting in only three usable elements in the transaction. The output pattern for writing a single patch in FIG. 2C requires multiple discontiguous writes gathered from multiple contiguous reads. In contrast, the output pattern for FIG. 2B is contiguous for both reads and writes.

The problem is further exacerbated if the input tensor data type is a 1-bit value instead of a 16- or 32-bit float value. First, if the width of the tensor is not evenly divisible by the native word size (32 bits), then additional indexing logic is required to handle boundary conditions at the end of the row. Second, bit values will most likely be stored in a native data type such as uint32_t. To extract input patches in CHW format, bit shuffling within a word further complicate patch extraction.

Channel major (HWC) order addresses these challenges by reading and writing contiguous memory regions even for binary values. A binary input tensor in FIGS. 2A-2C would then collapse to a single 5×5×1. The only constraint with this scheme is channel size must be a multiple of 32 which has been the case for most convolutional layers in many popular neural network architectures. When images are batched for inference, particular embodiments choose batched channel major or NHWC where N specifies the number of input images. NHWC is a natural choice as this scheme is the same data layout order as those output by JPEG and YUV decoders. For training and inference, batches are just concatenated. No transpositions between data layouts are necessary freeing the CPU from transformation tasks.

Particular embodiments disclosed herein use the NVIDIA GTX 1080 as the GPU testbed with CUDA 9.0 RC and cuDNN 7. Unless otherwise mentioned, particular embodiments use a block (tile) size of 1024 threads typically configured as 32×32×1. Due to the lack of support in mainstream DNN frameworks for bCNNs, particular embodiments implement and hand-tune the following DNN operations: (1) real and bGEMM, (2) activation (ReLU and binarization), (3) maxpooling, (4) batch normalization, (5) bias addition, and (6) patch extraction. All primitives operate on the HWC data layout format with no batching. All GPU implementations are tested for correctness with a CPU reference output. CPU implementations are validated with TensorFlow. All GPU implementations are latency-optimized and do not rely on batched execution to maximize performance. Particular embodiments average the execution time over 100,000 iterations. All device memory is pre-allocated with the exception of intermediate buffers which are pooled on-demand. The ResNet-50 models are trained with PyTorch.

Table 1 describes the convolutional layer configuration based on ResNet-50 used in the experimental testbed. Particular embodiments excluded the first layer (not shown) which our workload does not binarize. Particular embodiments exclude stride-2 layers for brevity. w, h, and c define the input tensor's width, height and channels, respectively. f defines the n×f×f×c weights tensor. q, r, and n define the q×r, r×n, and the q×n left, right, and output matrix dimensions, respectively, for matrix multiplication. r' is r/32, the binarized inner dimension used in bGEMM.

TABLE 1

Convolution layer parameters in ResNet-50 used in the experiments.

|     | w  | h  | c    | n    | f | q    | r     | r'  |
|-----|----|----|------|------|---|------|-------|-----|
| L0  | 56 | 56 | 256  | 256  | 1 | 3136 | 256   | 8   |
| L1  | 56 | 56 | 256  | 256  | 3 | 3136 | 2304  | 72  |
| L2  | 56 | 56 | 256  | 64   | 1 | 3136 | 256   | 8   |
| L3  | 56 | 56 | 64   | 256  | 3 | 3136 | 576   | 18  |
| L4  | 28 | 28 | 256  | 512  | 3 | 784  | 1152  | 36  |
| L5  | 28 | 28 | 128  | 128  | 1 | 784  | 128   | 4   |
| L6  | 28 | 28 | 128  | 512  | 3 | 784  | 4608  | 144 |
| L7  | 28 | 28 | 512  | 128  | 1 | 784  | 512   | 16  |
| L8  | 14 | 14 | 512  | 1024 | 3 | 196  | 2304  | 72  |
| L9  | 14 | 14 | 256  | 256  | 1 | 196  | 256   | 8   |
| L10 | 14 | 14 | 256  | 256  | 1 | 196  | 1024  | 32  |
| L11 | 14 | 14 | 1024 | 1024 | 3 | 196  | 9216  | 288 |
| L12 | 7  | 7  | 1021 | 512  | 1 | 49   | 512   | 16  |
| L13 | 7  | 7  | 512  | 2048 | 3 | 49   | 4608  | 144 |
| L14 | 7  | 7  | 2048 | 512  | 1 | 49   | 2048  | 64  |
| L15 | 7  | 7  | 2048 | 2048 | 3 | 49   | 18432 | 576 |

The first experiment seeks to answer: what is the empirical speedup of matrix multiply when replacing FMADs with XOR/POPCOUNTs in GEMM? This experiment benchmarks the matrix multiplication building block in isolation and excludes patch extraction, batch normalization, pooling, and activations. The numbers from this experiment represents an upper-bound, sustained performance improvement number and should not be misinterpreted as improvements in end-to-end network performance.

Both real and bGEMM implementations are optimized, are tiled for data reuse, and preloads inputs to shared memory followed by result accumulation inside GPU registers. Particular embodiments deliberately implemented an optimized real-valued GEMM routine instead of using cuBLAS to control and isolate the effects of differing implementations. Both real and bGEMM implementations are identical in terms of orchestrating computation on the GPU with the primary difference being the atomic unit of computation (referred to as microkernels below). Both real and bGEMM implementations produce the same result when the input is quantized to +1/−1.

Figure 3:
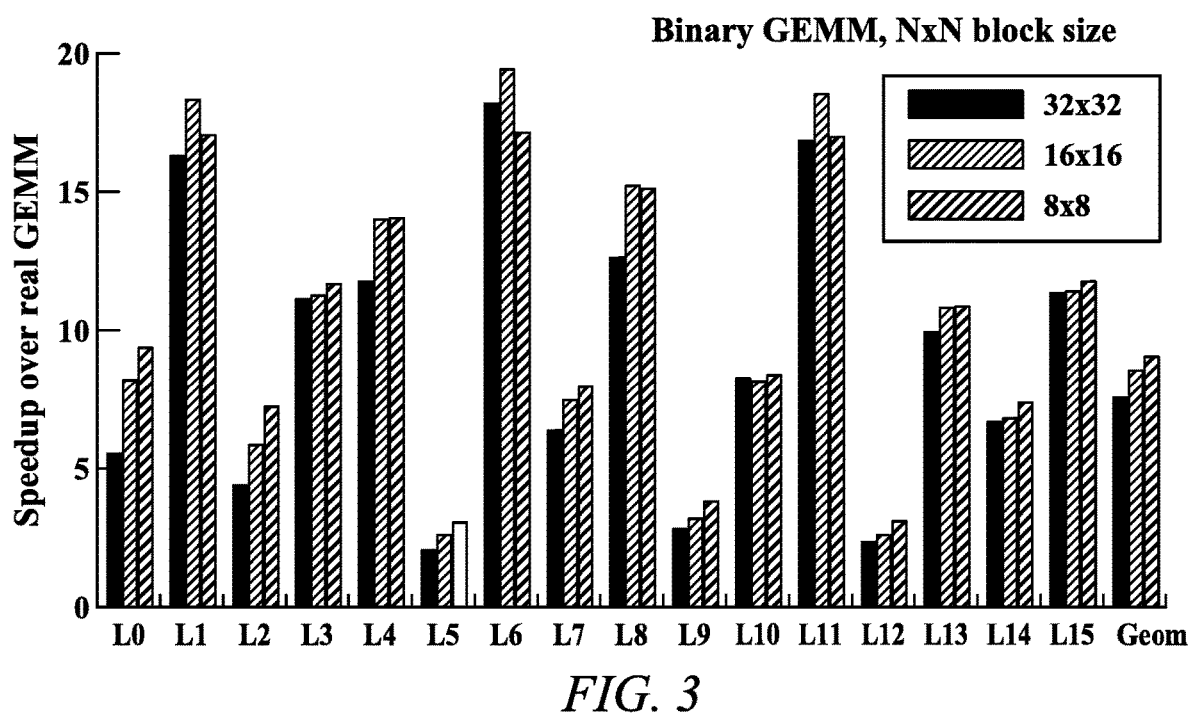
FIG. 3 illustrates example performance of real GEMM vs. bGEMM for layers found in ResNet-50 varying threadblock size for bGEMM.

FIG. 3 illustrates example performance of real GEMM vs. bGEMM for layers found in ResNet-50 varying threadblock size for bGEMM. The inputs are the extracted patches (lhs of the matrix multiply) and the weights (rhs). In bGEMM, the input and filters have already been binarized.

Effects on Threadblock size. The threadblock size directly controls the tile size of the matrix multiply. Ideally, the tile size should be large enough so there is sufficient data reuse behind the input and weights matrices. The matrix multiply implementations takes two matrices of size: q×r and r×n to produce an output of size q×n. r, and r' is the common dimension in real and binary matrix multiply, respectively. The bGEMM matrix sizes q, r', n are sensitive to the threadblock configuration since r' is a factor of 32 shorter than its real counterpart. This is evidenced in the results for L2, L5, L9, and L12 in FIG. 3 where r' ranges from 4-16. The embodiments disclosed herein recommend using a smaller block size (8×8) to address these tall-skinny matrices. The empirical results suggest that 32×32 is optimal in the real GEMM case (not shown), and 8×8 for the bGEMM case. The geometric speedup of using 8×8 bGEMM vs. 32×32 real GEMM is 9×.

FIG. 4 illustrates example microkernels representing the essence of real and binary matrix multiply. As displayed in FIG. 4, (a) is an example CUDA C code for the microkernels in real GEMM, (b) is an example CUDA C code for the microkernels in bGEMM, and (c) is an example CUDA C code for the optimized binary microkernels in bGEMM. In real GEMM, the micro-kernel is a dot product cast as a series of fused-multiply-and-add (FMAD) operations processing two float inputs to produce a float output. Both multiplication and add may be performed using a single FMAD instruction. In bGEMM, the computation is the masked xor product: popcount [(A XOR B) & C] operating on two 32-bit vectors to produce an int32_t output. The mask portion, & C, is required for boundary edge cases. Since bGEMM encodes {+1, −1}, there is no implicit zero padding value fir convolutions, thus requiring an extra input mask to be precalculated. In the real-valued case, the borders are initialized to 0.f, and multiplying by a border pixel is the same as zeroing it out. Both real and bGEMMs produce the same output assuming the data is constrained to +1/−1. The optimized binary microkernel requires four operations: XOR, AND, popcount, and integer-add. In (c), scale and bias factors are folded into the batch normalization layer following convolution.

The mask vector C is "0b0" if the current value is outside the boundary of the input tensor, and "0b1" otherwise. Finally, because we use bit masking to exclude pixels outside the border, we must normalize by the effective vector length since masking excludes certain pixels from the computation. This compensation factor is a simple subtraction of popc(~mask_adjustment) from the accumulated result.

To reach the microkernel optimized xor product, the embodiments disclosed herein use the algebraic identity, popc(~x)=N−popc(x) where N is the length of the vector x. After factoring the common pop-count term, this reduces the number of popcounts from two to one. The embodiments disclosed herein forego the XNOR operation in lieu of XOR saving a negation operation. The computation is still correct when using the subexpression formed in num_negative_ones. Finally, the embodiments disclosed herein factor out any multiplications and biases applied to the xor product by fusing scale factors and bias additions. The embodiments disclosed herein apply these scales and biases once per output result prior to writing the results to global memory. The optimized micro-kernel with minimal subexpressions is shown in FIG. 4.

TABLE 2

Throughput of Native Arithmetic Instructions for Compute Capability 6.1 (e.g., GTX 1080). Popcount operations on NVIDIA GPUs are ¼th of the throughput of float operations, while integer operations like IADD, XOR, and operate at the full rate.

| Instruction (32-bit) | Operations Per Cycle Per SM |
|---|---|
| FMAD, FADD, FMUL | 128 |
| XOR, AND, OR | 128 |
| IADD | 128 |
| Integer Shift | 64 |
| POPCOUNT | 32 |
| IMAD, IMUL | Multiple instr. |

The embodiments disclosed herein construct a simple analytical model to mark the upper-bound performance difference between real and binary convolution. The embodiments disclosed herein analyze instruction throughput for calculating a 32-element dot product vs. a 32-element xor product. In real convolution, this requires 32 float (128 bytes) values, while in binary convolution, this requires a single int32_t (4 bytes) word. The embodiments disclosed herein show peak instruction throughput for compute capability 6.1 devices (i.e., for the GTX 1080 testbed) in Table 2. The right column shows the number of instructions that may be executed per streaming multiprocessor per cycle. Executing binary instructions like XOR, AND, OR is equal in throughput with their FMAD, FADD, FMUL counterparts. However, popcount operations are ¼th of the total throughput of those operations lowering the mean when computing the xor product. Despite popcount being slower and bottlenecking the computation, the xor product benefits, in part, from SIMD within a word; each instruction in FMAD computes a set of float input elements at a time, while each instruction in the xor product operates on sets of 32-bit input elements at a time.

The instruction throughput for computing a 32-element dot product using FMAD operations would be 128/32=4. In the binary convolution case, it takes 1 IADD, 1 XOR, 1 AND, and 1 POPC. Thus, the instruction throughput for computing a 32-element xor product would be (128+128+128+32)/4=104 resulting in an upper-bound theoretical instruction throughput speedup of 104/4=26×. This theoretical number is under ideal conditions where there is enough ILP to overlap instructions in a pipelined fashion and instructions may execute on independent execution units. This number does not take into account the memory subsystem, but serves as a proxy for an upper-bound improvement between real and binary convolution.

The embodiments disclosed herein calculate the operational intensity or ratio of floating point operations per byte transferred over DRAM (FLOP:byte) for real convolution. The embodiments disclosed herein also calculate the analog for binary convolution: integer operations per byte of DRAM transferred (INTOP:byte). Let s signify the width and height dimensions of the input tensor (most CNNs use input/output tensors of equal dimension). Let c signify the number of input channels for the input tensor. Furthermore, let f and n signify the filter size and number of output channels, respectively, for the weights. The embodiments disclosed herein seek to calculate the operational intensities of a single convolution layer which ingests an input tensor of size: $s^2 \times c$ and a weights tensor of size: $f^2 \times c \times n$ to produce to produce an output tensor of size: $s^2 \times n$.

Real Convolution. To compute real convolution, there are $5^2 \times n$ dot products. Each dot product contains $2 \times f^2 \times c$ FLOPs (each FMAD operation in the dot product is considered 2 FLOPs). For transferring the input over DRAM, the input tensor is $4 \times s^2 \times n$ bytes. The filters is $4 \times f^2 \times c \times n$ bytes.

In its simplified form, the FLOP:byte ratio for real convolutions is:

$$\frac{s^2 f^2 cn}{2(s^2 c + f^2 cn)} \frac{FLOP}{byte}$$

Binary-valued Convolution. To compute binary convolution, there are $s^2 \times n$ xor products. Each xor product computes $(4 \times f^2 \times c)/32$. The divide-by-32 factor is the number of input elements processed per xor product. The factor-of-4 is from the number of operations to calculate an xor product. These operations are: IADD, XOR, AND, and POPC. This results in the number of integer operations as: $(s^2 \times n \times f^2 \times c)/8$.

For transferring the input over DRAM, the input tensor and weights consume $(s^2 \times c)/8$ and $(f^2 \times c \times n)/8$ bytes, respectively. The divide-by-8 factor is the number of bits per byte since each element is a bit. In its simplified form, the operational intensity of binary convolution in terms of the INTOP:byte ratio is:

$$\frac{s^2 f^2 cn}{s^2 c + f^2 cn} \frac{INTO P}{byte}$$

Both numerators (number of operations) in Equations 1 and 2 are equivalent for real and binary convolution, yet they differ only in a multiplicative factor-of-2 in the denominator resulting in binary convolution being more compute intensive than its real-valued counterpart. This makes it even more important for the popcount instruction to operate at an IPC equivalent to its FADD and IADD counterparts as it bottlenecks the overall throughput of binary convolution.

The second experiment seeks to answer: what is the execution breakdown of GEMM and bGEMM in concert with other layers? Particular embodiments benchmark GEMM and bGEMM within their respective basic blocks. Recall a basic block is a unit of computation comprising of all operations inside a convolutional layer. In the PyTorch trained real-valued ResNet-50 model, real basic blocks consist of the following layer operations and in the following order: (1) patch extraction, (2) real matrix multiplication, (3) batch normalization, and (4) activation. In our production-level hybrid/real ResNet-50 model, real basic blocks are identical to its PyTorch version, but binary basic blocks consist of: (1) extraction, (2) binary matrix multiplication, (3) bias addition, (4) batch normalization, and (5) activation (binarization). Bias addition and batch normalization layers are implemented using fused-multiply-and-add (FMA) kernels with multipliers and bias factors precomputed depending on the layer type. It is noted that the binarization step in the binary basic blocks reduces the data input size by a factor of 32 prior to patch extraction.

Figure 5:
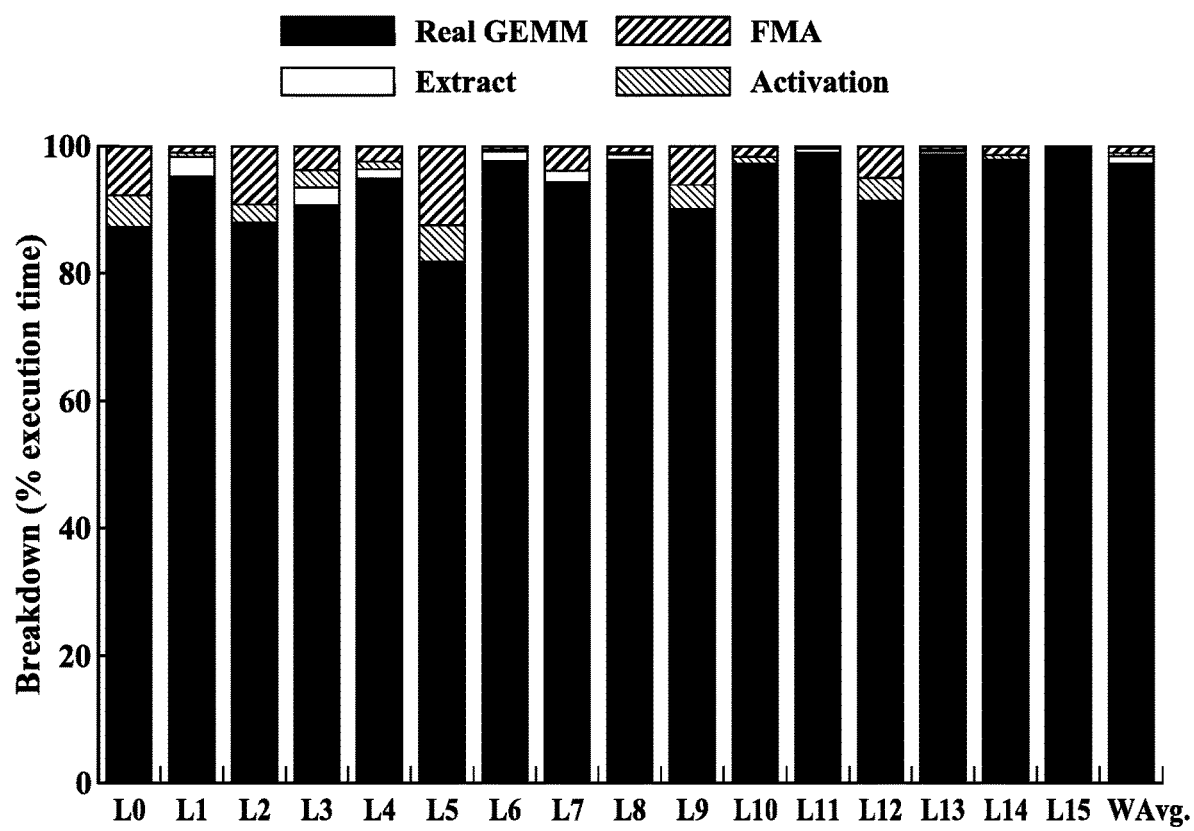
FIG. 5 illustrates an example breakdown of real GEMM in concert with other layers in a real basic block.
Figure 6:
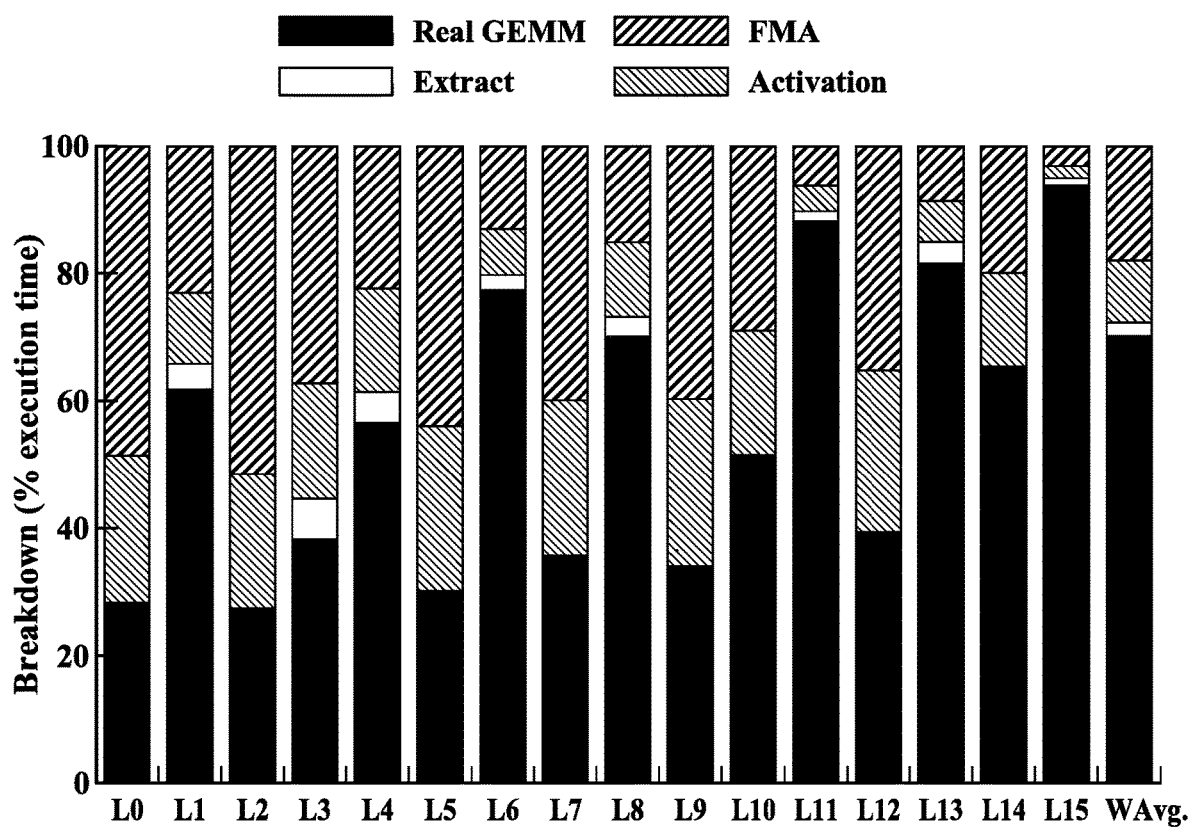
FIG. 6 illustrates an example breakdown of bGEMM in concert with other layers in a binary basic block.

FIG. 5 illustrates an example breakdown of real GEMM in concert with other layers in a real basic block. FIG. 6 illustrates an example breakdown of bGEMM in concert with other layers in a binary basic block. Each individual bar shows each basic block's execution breakdown. The weighted average bar (on the right) weighs the execution time of all basic blocks shown. The real-valued basic block (FIG. 5) confirms previous work that GEMM dominates most of the execution time inside these layers. This is not the case for bGEMM (FIG. 6). bGEMM exhibits balance in execution time across layer types suggesting that fusing operations may further improve performance. It is also noted that filter sizes of 1×1 in the HWC data layout does not require patch extraction for either the real or binary basic blocks. Particular embodiments summarize the weighted average % of execution in real and binary basic blocks. For GEMM, 97.1% and 70.2%, respectively. For patch extraction, 1.2% and 2.2%, respectively. For activation, 0.5% and 9.9%, respectively. For FMA, 0.95% and 17.8%. These results suggest that almost 30% of the execution time in the binary basic block is spent on real-valued operations. Motivated by the breakdown of execution for binary basic blocks, particular embodiments disclose several optimizations that mitigate the contribution of each real-valued layer.

The third experiment seeks to answer: what is the effect of layer-wise fusion in the binary basic block? Particular embodiments define the binary tax as the % of execution time spent on real-valued operations inside a binary basic block which comprises 30% according to the baseline weighted average in FIG. 6. Particular embodiments disclose three optimizations to mitigate the cost of the binary tax: (1) fuse bias+BN, (2) FMA in bGEMM, and (3) binarize in bGEMM. The first optimization comes from the observation that both bias addition and batch normalization perform identical fused-multiply-and-add (FMA) operations and are both in $\mathbb{R}^C$. Thus, bias addition and batch normalization may be algebraically folded into a simpler subexpression. The second optimization, FMA in BGEMM, fuses the binary GEMM and FMA operation into a single kernel. The third optimization fuses both FMA and binarization inside the bGEMM kernel.

Figure 7:
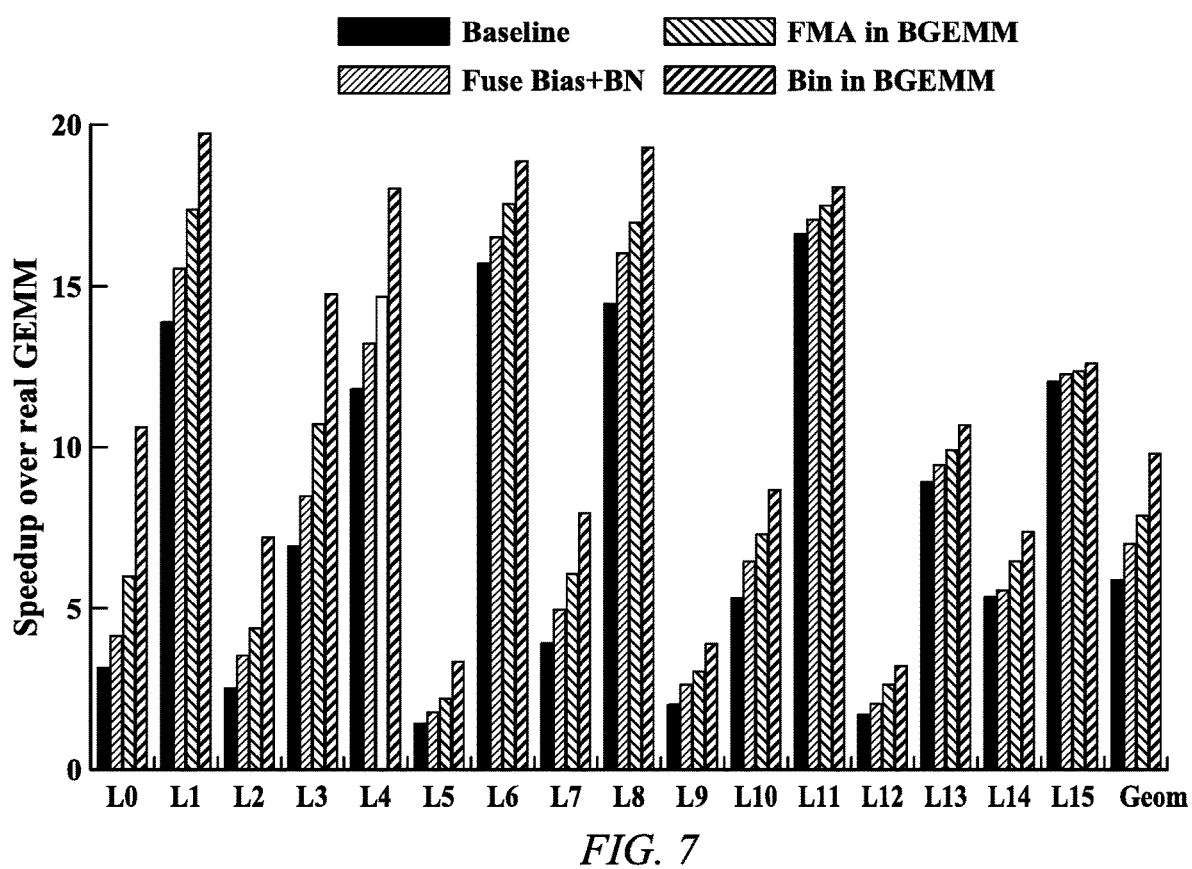
FIG. 7 illustrates example effects of layer-fusion on performance.

FIG. 7 illustrates example effects of layer-fusion on performance. Our binary basic block (fused) implementations improve geometric mean performance by a factor of 5.9×, 7.1×, 7.9×, and 9.9× for the baseline, fuse bias+BN, FMA in bGEMM, and binarize in bGEMM implementations, respectively, over the real basic block. The fully fused binary basic block is 66% faster than the baseline binary basic block. The binary basic block baseline performs the bGEMM→bias addition→batch norm→activation (binarization)→extraction as independent, individual kernel computations.

Fuse bias+BN. In particular embodiments, the binary convolutional neural network may further comprise at least one batch normalization layer and at least one bias layer. The computing system may fuse the at least one batch normalization layer with the at least one bias layer. Here, particular embodiments disclose fusing batch normalization with bias addition. The result of the fusion is two vectors: multipliers and biases in $\mathbb{R}^c$. Let x be a scalar output of the convolution, b the bias, $\mu$, $\delta^2$ as the mean and standard deviation and y and $\beta$ represent the learned affine parameters in batch normalization. Then, conv→bias→batch norm has the following computation:

$$\frac{s^2 f^2 cn}{s^2 c + f^2 cn}$$

Since b, μ, δ, γ and β are in $\mathbb{R}^c$ and ε is a constant, the bias and batch normalization layers may be represented as q×x+r where $$q = \frac{\gamma}{\sqrt{\delta^2 + \epsilon}}$$

and r=q×(b−μ)+β.q and r are in $\mathbb{R}^c$. This formulation reduces the number of FMA kernel calls from two to one while producing the same output as the original, unfused binary basic block.

FMA in bGEMM. In the previous iteration, bias and batch normalization is fused into a set of fused-multiply-and-add operations. The previous approach applies the FMA operation as an independent kernel. Here, particular embodiments apply the FMA operation directly to the bGEMM output prior to writing to global memory. In other words, the computing system may apply one or more fused-multiply-and-add operations to the output. The savings in this optimization is primarily in data movement, saving one read and write of the output tensor of size Rw×h×c.

Binarize in bGEMM. This optimization applies the previous and additionally fuses binarization prior to writing to the output. The main difficulty here is to orchestrate computation to perform binarization in concert with the bGEMM kernel. Particular embodiments disclose a novel scheme to performing binarization using the NVIDIA shuffle instruction below.

Computation to core. The bGEMM implementation use a kernel launch configuration similar to its real GEMM counterpart. For this example, let the block size be 32×32. Recall in optimized, tiled matrix multiply, the block size defines the tile size of the output matrix where each thread is responsible for computing a single output value in the output matrix.

Particular embodiments compute the accumulated XOR product for the 32×32 tile producing a 32×32 (float32) output for the threadblock. In this fused implementation, each tile's goal is to binarize these float32 values to produce a 32×1 (uint32_t) output that is written out to global memory.

Consider the role of a single warp. The warp, in lockstep, produces 32 float32 output values. The warp then reduces the 32 float values into a single uint32_t. In binarization, each thread in the warp extracts the sign bit via parallel comparison. Depending on the thread's warp ID, the sign bit is shifted into an intermediate uint32_t word initialized to 0. The problem is now to reduce 32 uint32_t words into a single uint32_t. Since all memory values that need to be communicated are within the warp, particular embodiments skip the use of shared memory by using the NVIDIA shuffle instruction. Shuffle skips the overhead of writing to and from shared memory allowing for a faster path to exchange data within a warp using a single instruction. For a warp of size 32, this requires log 2 (32)=5 shuffle exchanges and accumulation to reduce the 32 uint32_t words into a single word. The warp leader (thread 0 in the warp) then writes the binarized uint32_t word into global memory. In a 32×32 thread block, 32 warp leaders write their warp's binarized output directly to global memory improving global memory write size (and consequently the global memory read size in the next layer) by a factor of 32.

Particular embodiments implement 32×32, 16×16, and 8×8 tile sizes with the fused bGEMM kernels with FMA and binarization. In the binarization step, instead of fully reducing across the warp, particular embodiments partition the warp into subwarps proportional to its block size. Like the previous experiment (FIG. 6), the 8×8 tile size fused bGEMM outperforms the 16×16 and 32×32 variants.

In the final fused binary basic block, 3.4% of execution time is spent of extracting binarized input patches and the rest of the computation is spent on the fused: bGEMM→FMA→binarize unikernel. Because binarized patch extraction does not consume a significant amount of GPU cycles, particular embodiments do not consider fusing the basic block any further.

TABLE 3

Memory consumption analysis for ResNet-50

| Layer | ResNet-50 real/binary | ResNet-50 real only |
|---|---|---|
| Convolution (binary) | 2.5 MiB | — |
| Convolution (real) | 10.6 MiB | 89.5 MiB |
| Fully-connected (real) | 7.81 MiB | 7.81 MiB |
| Batch Normalization (real) | 0.21 MiB | 0.21 MiB |
| Total | 21.08 MiB | 97.49 MiB |

Table 3 estimates the memory efficiency of a hybrid real/binary ResNet-50 model compared to a PyTorch trained ResNet-50 real only model. The assumptions are based on previous work that only certain layers may be binarized. For conv. layers, the memory usage of weights in the real/binary ResNet-50 model is about 13.1 MiB compared to 89.47 MiB (a 6.8× improvement). At the network-level, this improvement diminishes to 4.6× when including the large FC layer at the end of the network consuming 7.81 MiB or about 37% of all network parameters in the real/binary ResNet-50 model. The weights in batch normalization play an insignificant role in memory consumption contributing only 0.9% of the weights in the real/binary model.

Figure 8:
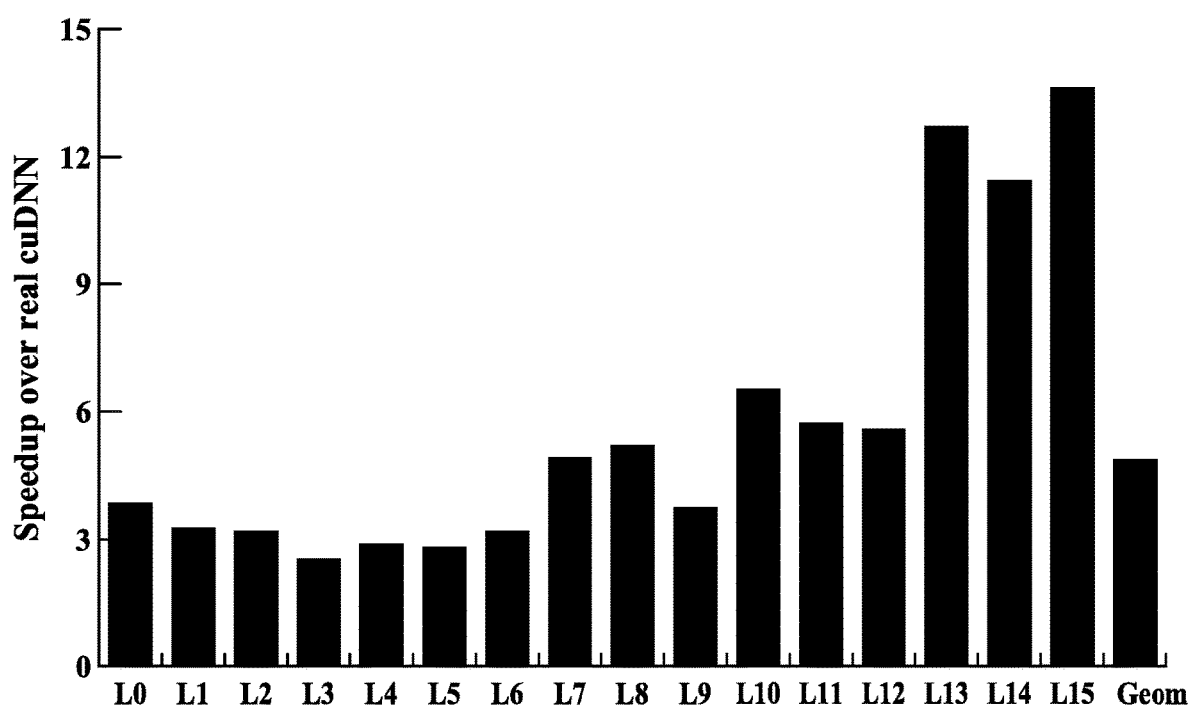
FIG. 8 illustrates example speedup over cuDNN at the basic block level.

Particular embodiments benchmark the real and binary basic blocks using cuDNN 7 as a backend. Particular embodiments replace the real basic block's patch extraction and real GEMM step with cuDNN convolution. For each convolutional layer in the experiment, particular embodiments set cuDNN to use the fastest available convolution according to that layer's parameters via the CUDNN_FWD_PREFER_FASTEST setting and a memory limit of up to 8 GiB on our GTX 1080. FIG. 8 illustrates example speedup over cuDNN at the basic block level. In FIG. 8, the fully fused binary basic block outperforms the cuDNN real basic block by a geometric mean of 4.9×. Using nvprof, the backend cuDNN convolutions for our layer parameter set uses the implicit_gemm_scudnn_128× 128_relu implementation and about 96% of execution time of the real basic block is spent on this kernel. The rest of the computation in the real basic block is FMA (2%) and activation (1%). It is believed that cuDNN is batch optimized and is not yet equipped to handle the case where batch size=1.

Figure 9:
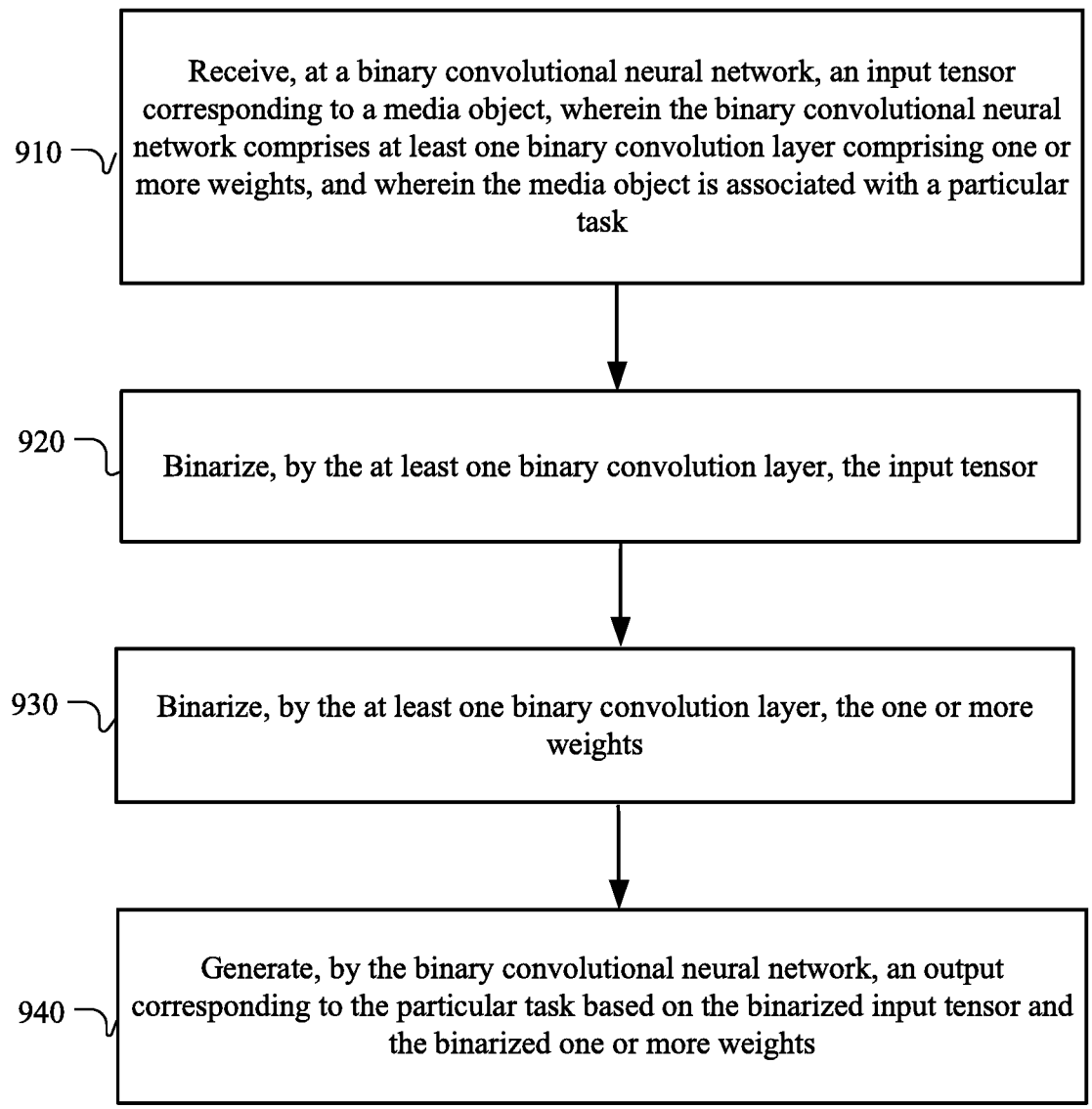
FIG. 9 illustrates an example method for generating an output responsive to an input tensor.

FIG. 9 illustrates an example method 900 for generating an output responsive to an input tensor. The method may begin at step 910, where the computing system may receive, at a binary convolutional neural network, an input tensor corresponding to a media object, wherein the binary convolutional neural network comprises at least one binary convolution layer comprising one or more weights, and wherein the media object is associated with a particular task. At step 920, the computing system may binarize, by the at least one binary convolution layer, the input tensor. At step 930, the computing system may binarize, by the at least one binary convolution layer, the one or more weights. At step 940, the computing system may generate, by the binary convolutional neural network, an output corresponding to the particular task based on the binarized input tensor and the binarized one or more weights. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating an output responsive to an input tensor, including the particular steps of the method of FIG. 9, this disclosure contemplates any suitable method for generating an output responsive to an input tensor, including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
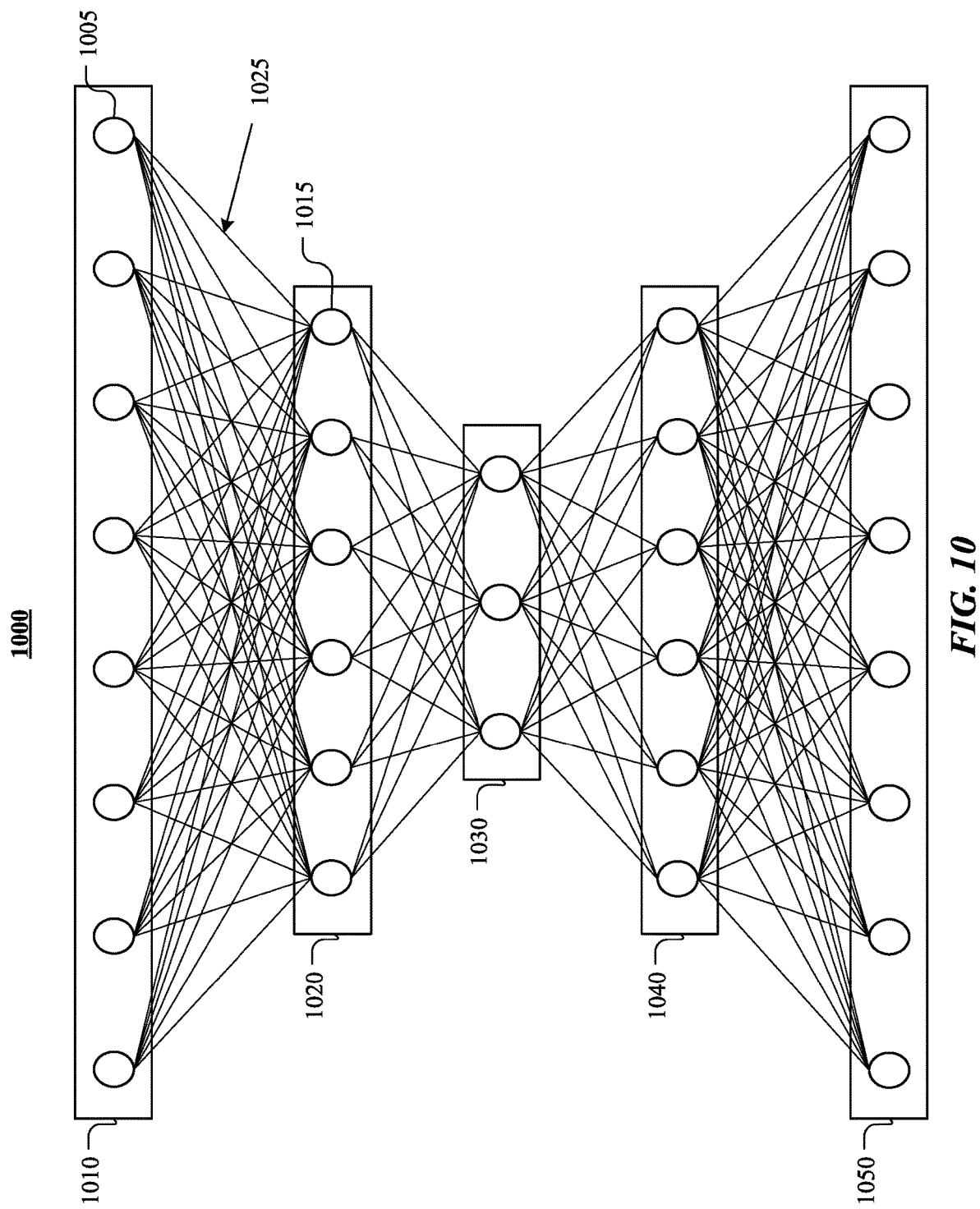
FIG. 10 illustrates an example artificial neural network.

FIG. 10 illustrates an example artificial neural network ("ANN") 1000. In particular embodiments, an ANN may refer to a computational model comprising one or more nodes. Example ANN 1000 may comprise an input layer 1010, hidden layers 1020, 1030, 1040, and an output layer 1050. Each layer of the ANN 1000 may comprise one or more nodes, such as a node 1005 or a node 1015. In particular embodiments, each node of an ANN may be connected to another node of the ANN. As an example and not by way of limitation, each node of the input layer 1010 may be connected to one of more nodes of the hidden layer 1020. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 10 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 10 depicts a connection between each node of the input layer 1010 and each node of the hidden layer 1020, one or more nodes of the input layer 1010 may not be connected to one or more nodes of the hidden layer 1020.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1020 may comprise the output of one or more nodes of the input layer 1010. As another example and not by way of limitation, the input to each node of the output layer 1050 may comprise the output of one or more nodes of the hidden layer 1040. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1025 between the node 1005 and the node 1015 may have a weighting coefficient of 0.4, which may indicate that 0.4 multiplied by the output of the node 1005 is used as an input to the node 1015. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1000 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Figure 11:
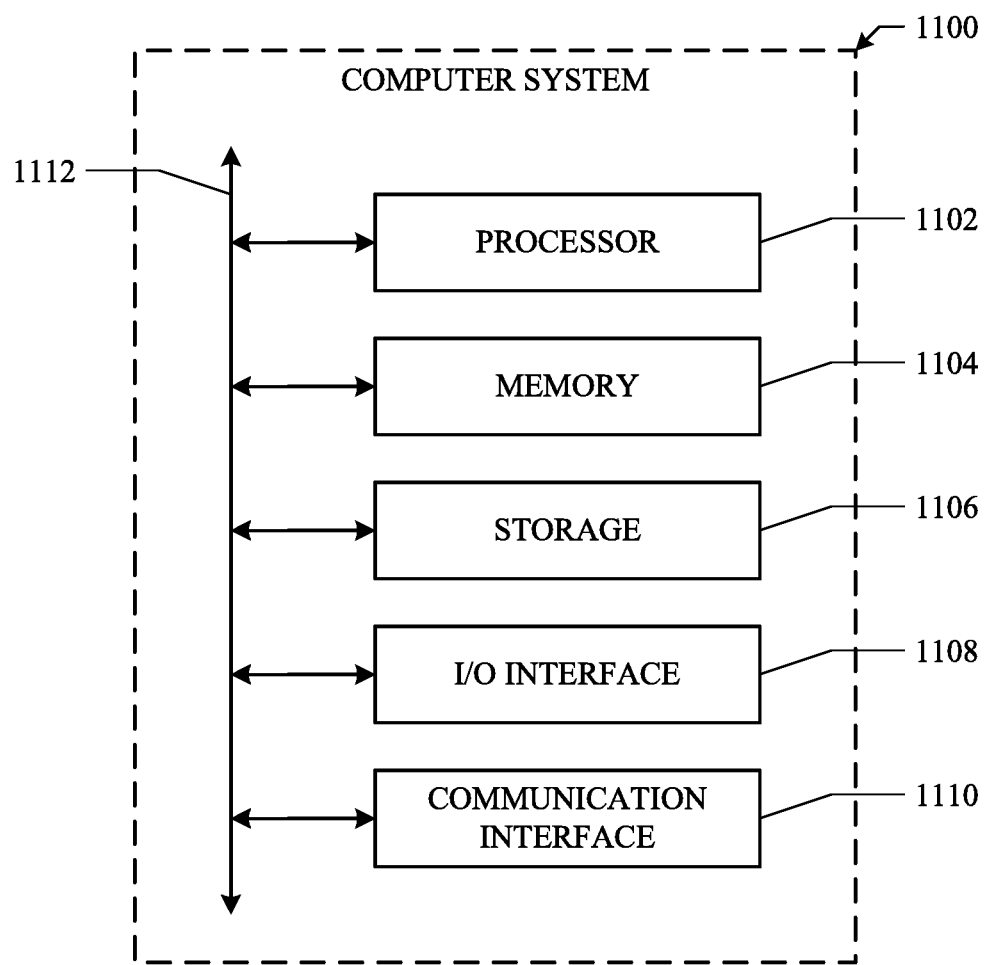
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   generating an input tensor based at least in part on a media object associated with a particular task;
   providing, to a binary convolutional neural network, the input tensor generated based at least in part on the media object, wherein the binary convolutional neural network comprises at least one binary convolution layer comprising one or more weights;
   binarizing, by the at least one binary convolution layer, the input tensor generated based at least in part on the media object;
   binarizing, by the at least one binary convolution layer, the one or more weights; and providing by the binary convolutional neural network, an output corresponding to performance of the particular task based on the binarized input tensor and the binarized one or more weights.

2. The method of claim 1, wherein the input tensor comprises a plurality of values, and
   wherein binarizing the input tensor comprises:
   extracting, for each of the plurality of values, a sign associated with the value; and
   packing, for each of the plurality of values, the extracted sign into a bitarray.

3. The method of claim 1, wherein the generating comprises:
   decoding the media object into an interleaved tensor comprising one or more values; and
   normalizing the one or more values to one or more floating-point values.

4. The method of claim 3, wherein binarizing the input tensor comprises:
   reading, by one or more warps, the one or more floating-point values; and
   performing, by the one or more warps, sign comparison and shift extraction on the one or more floating-point values.

5. The method of claim 1, wherein the input tensor is three-dimensional.

6. The method of claim 1, wherein the input tensor is associated with a particular data layout, wherein the particular data layout corresponds to one or more dimensionalities of the input tensor, wherein each of the one or more dimensionalities comprises one of height, width, or channel.

7. The method of claim 1, wherein generating the output corresponding to the particular task based on the binarized input tensor and the binarized one or more weights comprises:
   performing one or more binary convolutions between the binarized input tensor and the binarized one or more weights.

8. The method of claim 7, wherein each of the one or more binary convolutions is based on one or more of an XNOR operation or a POPCOUNT operation.

9. The method of claim 1, further comprising performing a patch extraction transformation on the input tensor, wherein the patch extraction transformation comprises:
   reading the input tensor in one or more particular windows; and
   representing the input tensor as a two-dimensional matrix.

10. The method of claim 1, wherein the binary convolutional neural network further comprises at least one batch normalization layer and at least one bias layer.

11. The method of claim 10, further comprising:
    fusing the at least one batch normalization layer with the at least one bias layer.

12. The method of claim 1, further comprising:
    applying one or more fused-multiply-and-add operations to the output.

13. The method of claim 1, wherein the media object comprises an image and the task comprises image classification for the image.

14. A system comprising:
    one or more processors; and
    a memory coupled to the processors comprising instructions executable by the processors, the processors being operable when executing the instructions to:
    receive, at a binary convolutional neural network, an input tensor corresponding to a media object, wherein the binary convolutional neural network comprises at least one binary convolution layer comprising one or more weights, and wherein the media object is associated with a particular task;
    binarize, by the at least one binary convolution layer, the input tensor;
    binarize, by the at least one binary convolution layer, the one or more weights; and
    generate, by the binary convolutional neural network, an output corresponding to the particular task based on the binarized input tensor and the binarized one or more weights.

15. The system of claim 14, wherein the input tensor comprises a plurality of values, and
    wherein binarizing the input tensor comprises:
    extracting, for each of the plurality of values, a sign associated with the value; and
    packing, for each of the plurality of values, the extracted sign into a bitarray.

16. The system of claim 14, wherein the processors are further operable when executing the instructions to generate the input tensor, wherein the generation comprises:
    decoding the media object into an interleaved tensor comprising one or more values; and
    normalizing the one or more values to one or more floating-point values.

17. The system of claim 14, wherein binarizing the input tensor comprises:
    reading, by one or more warps, the one or more floating-point values; and performing, by the one or more warps, sign comparison and shift extraction on the one or more floating-point values.

18. The system of claim 14, wherein the input tensor is three-dimensional.

19. The system of claim 14, wherein the input tensor is associated with a particular data layout, wherein the particular data layout corresponds to one or more dimensionalities of the input tensor, wherein each of the one or more dimensionalities comprises one of height, width, or channel.

20. The system of claim 14, wherein generating the output corresponding to the particular task based on the binarized input tensor and the binarized one or more weights comprises:
performing one or more binary convolutions between the binarized input tensor and the binarized one or more weights.

21. One or more computer-readable non-transitory storage media embodying software comprising instructions operable when executed to:
receive, at a binary convolutional neural network, an input tensor corresponding to a media object, wherein the binary convolutional neural network comprises at least one binary convolution layer comprising one or more weights, and wherein the media object is associated with a particular task;
binarize, by the at least one binary convolution layer, the input tensor;
binarize, by the at least one binary convolution layer, the one or more weights; and
generate, by the binary convolutional neural network, an output corresponding to the particular task based on the binarized input tensor and the binarized one or more weights.

\* \* \* \* \*